US008541637B2

(12) United States Patent
Babicki et al.

(10) Patent No.: US 8,541,637 B2
(45) Date of Patent: Sep. 24, 2013

(54) PROCESS AND SYSTEM FOR THERMOCHEMICAL CONVERSION OF BIOMASS

(75) Inventors: Matthew L. Babicki, West Vancouver (CA); Brian G. Sellars, Coquitlam (CA); Bowie G. Keefer, Galiano Island (CA); Edson Ng, North Vancouver (CA)

(73) Assignee: G4 Insights Inc., Burnaby, British Columbia (CA)

( * ) Notice: Subject to any disclaimer, the term of this patent is extended or adjusted under 35 U.S.C. 154(b) by 703 days.

(21) Appl. No.: 12/718,533

(22) Filed: Mar. 5, 2010

(65) Prior Publication Data
US 2010/0228062 A1    Sep. 9, 2010

Related U.S. Application Data

(60) Provisional application No. 61/157,877, filed on Mar. 5, 2009.

(51) Int. Cl.
*C07C 1/00* (2006.01)
*C10L 3/00* (2006.01)
*B01J 8/00* (2006.01)

(52) U.S. Cl.
USPC .............. 585/240; 201/25; 48/203; 48/127.7; 48/197

(58) Field of Classification Search
USPC ................... 201/25; 585/240, 242; 48/203, 48/127.7, 197
See application file for complete search history.

(56) References Cited

U.S. PATENT DOCUMENTS

| 3,070,703 A | 12/1962 | Podolny |
| 3,336,162 A | 8/1967 | Zachmann |
| 3,748,180 A | 7/1973 | Clausi et al. |
| 3,847,672 A | 11/1974 | Trocciola et al. |
| 3,865,924 A | 2/1975 | Gidaspow et al. |

(Continued)

FOREIGN PATENT DOCUMENTS

| CA | 1256038 | 6/1989 |
| CA | 2016045 | 8/1994 |

(Continued)

OTHER PUBLICATIONS

Carson et al., "Thermodynamics of Pressure Swing Adsorption (PSA) in the Recovery of Residual Hydrogen from SOFC Anode Gas," *Proceedings of the Intersociety Energy Conversion Engineering Conference* Conf.30:229-234, Jan. 1, 1995.

(Continued)

*Primary Examiner* — Nina Bhat
(74) *Attorney, Agent, or Firm* — Klarquist Sparkman, LLP

(57) ABSTRACT

A system and method for converting biomass into fluid hydrocarbon products to minimize the use of fossil fuels, provide energy and chemical feedstock security, and sustainable and/or carbon neutral electric power, are disclosed. For example, fast pyrolysis can be performed on biomass to produce pygas and char using a maximum processing temperature of about 650° C. The pygas is provided to an independent reactor without the addition of an oxidizing agent for catalytically converting the pygas to hydrocarbons using a maximum processing temperature of about 650° C. A system comprising fast pyrolysis means producing a pygas and char, independent catalytic conversion means downstream of the fast pyrolysis for converting the pygas to hydrocarbons, and a hydrogen source, external to the system and/or produced by a steam reformer by steam reformation of at least a portion of the hydrocarbons, coupled to catalytic conversion means, also are described.

50 Claims, 2 Drawing Sheets

(56) References Cited

U.S. PATENT DOCUMENTS

| | | |
|---|---|---|
| 3,975,913 A | 8/1976 | Erickson |
| 4,135,361 A | 1/1979 | Eisenhaure |
| 4,386,309 A | 5/1983 | Peschka |
| 4,532,192 A | 7/1985 | Baker et al. |
| 4,555,453 A | 11/1985 | Appleby |
| 4,595,642 A | 6/1986 | Nakanishi et al. |
| 4,759,997 A | 7/1988 | Ohyauchi et al. |
| 4,781,735 A | 11/1988 | Tagawa |
| 4,801,308 A | 1/1989 | Keefer |
| 4,816,121 A | 3/1989 | Keefer |
| 4,822,935 A | 4/1989 | Scott |
| 4,968,329 A | 11/1990 | Keefer |
| 4,969,935 A | 11/1990 | Hay |
| 4,988,580 A | 1/1991 | Ohsaki et al. |
| 5,068,159 A | 11/1991 | Kinoshita |
| 5,079,103 A | 1/1992 | Schramm |
| 5,147,735 A | 9/1992 | Ippommatsu et al. |
| 5,175,061 A | 12/1992 | Hildebrandt et al. |
| 5,256,172 A | 10/1993 | Keefer |
| 5,292,598 A | 3/1994 | Rosner |
| 5,328,503 A | 7/1994 | Kumar |
| 5,366,818 A | 11/1994 | Wilkinson et al. |
| 5,408,832 A | 4/1995 | Boffito et al. |
| 5,411,578 A | 5/1995 | Watson |
| 5,434,016 A | 7/1995 | Benz et al. |
| 5,504,259 A * | 4/1996 | Diebold et al. ............ 568/697 |
| 5,523,176 A | 6/1996 | Fonda-Bonardi |
| 5,523,326 A | 6/1996 | Dandekar et al. |
| 5,543,238 A | 8/1996 | Strasser |
| 5,593,640 A | 1/1997 | Long et al. |
| 5,604,047 A | 2/1997 | Bellows et al. |
| 5,645,950 A | 7/1997 | Benz et al. |
| 5,686,196 A | 11/1997 | Singh et al. |
| 5,711,926 A | 1/1998 | Knaebel |
| 5,714,276 A | 2/1998 | Okamoto |
| 5,811,201 A | 9/1998 | Skowronski |
| 5,832,728 A | 11/1998 | Buck |
| 5,867,978 A | 2/1999 | Klanchar et al. |
| 5,900,329 A | 5/1999 | Reiter et al. |
| 5,917,136 A | 6/1999 | Gaffney et al. |
| 5,981,096 A | 11/1999 | Hornburg et al. |
| 5,982,857 A | 11/1999 | Kapoor et al. |
| 6,045,933 A | 4/2000 | Okamoto |
| 6,051,050 A | 4/2000 | Keefer et al. |
| 6,110,612 A | 8/2000 | Walsh |
| 6,170,264 B1 | 1/2001 | Viteri et al. |
| 6,176,897 B1 | 1/2001 | Keefer |
| 6,190,623 B1 | 2/2001 | Sanger et al. |
| 6,190,791 B1 | 2/2001 | Hornburg |
| 6,194,092 B1 | 2/2001 | Ohara et al. |
| 6,206,630 B1 | 3/2001 | Feltenberger et al. |
| 6,283,723 B1 | 9/2001 | Milburn et al. |
| 6,293,767 B1 | 9/2001 | Bass |
| 6,305,442 B1 | 10/2001 | Ovshinsky et al. |
| 6,312,843 B1 | 11/2001 | Kimbara et al. |
| 6,627,338 B2 | 9/2003 | St-Pierre et al. |
| 6,854,273 B1 | 2/2005 | Lasley et al. |
| 6,863,878 B2 * | 3/2005 | Klepper ............ 423/650 |
| 7,553,568 B2 | 6/2009 | Keefer et al. |
| 7,868,214 B2 * | 1/2011 | Marker ............ 585/240 |
| 7,872,054 B2 * | 1/2011 | Cortright et al. ............ 518/700 |
| 7,960,598 B2 * | 6/2011 | Spilker et al. ............ 585/240 |
| 8,015,808 B2 | 9/2011 | Keefer et al. |
| 8,063,258 B2 * | 11/2011 | Bartek et al. ............ 585/240 |
| 8,147,766 B2 * | 4/2012 | Spilker et al. ............ 422/187 |
| 2002/0142198 A1 | 10/2002 | Towler et al. |
| 2002/0142208 A1 | 10/2002 | Keefer et al. |
| 2007/0170091 A1 | 7/2007 | Monnier et al. |
| 2010/0228062 A1 | 9/2010 | Babicki et al. |

FOREIGN PATENT DOCUMENTS

| | | |
|---|---|---|
| CA | 2109055 | 2/1999 |
| CA | 2087972 | 1/2000 |
| CA | 2087973 | 1/2001 |
| CA | 2475015 | 8/2003 |
| CA | 2476409 | 9/2003 |
| CA | 2718295 | 10/2009 |
| DE | 3913581 | 10/1990 |
| EP | 0 341 189 | 11/1989 |
| EP | 0 143 537 | 3/1990 |
| EP | 0 681 860 | 11/1995 |
| EP | 0 691 701 | 1/1996 |
| EP | 1 070 531 | 1/2001 |
| JP | 62278770 | 3/1987 |
| JP | 06-208853 | 7/1994 |
| JP | 07094200 | 4/1995 |
| JP | 07-279758 | 10/1995 |
| JP | 8045526 | 2/1996 |
| JP | 11214021 | 8/1999 |
| JP | 2000-072401 | 3/2000 |
| WO | WO 95/28510 | 10/1995 |
| WO | WO 99/46032 | 9/1999 |
| WO | WO 00/21911 | 4/2000 |
| WO | WO 00/75559 | 12/2000 |
| WO | WO 00/76628 | 12/2000 |
| WO | WO 00/76630 | 12/2000 |
| WO | WO 01/00987 | 1/2001 |
| WO | WO 02/35623 | 5/2002 |
| WO | WO 02/102943 | 12/2002 |
| WO | WO 2004/030130 | 4/2004 |
| WO | WO 2007/041293 | * 12/2007 |
| WO | WO 2008/033812 | 3/2008 |
| WO | WO 2009/007061 | 1/2009 |
| WO | WO 2009/124017 | 10/2009 |

OTHER PUBLICATIONS

Chatsiriwech et al., "Enhancement of Catalytic Reaction by Pressure Swing Adsoprtion," *Catalysis Today* 20:351-366, 1994.

Fyke et al., "Recovery of Thermomechanical Exergy From Cryofuels," *Int. J. Hydrogen Energy* 22(4):435-440, 1997.

Hufton et al., "Sorption Enhanced Reaction Process for Hydrogen Production," *AIChE Journal* 45(2):248-256, 1999.

Oshima et al., "The utilization of $LH_2$ and LNG cold for generation of electric power by a cryogenic type Stirling Engine," *Cryogenics* 617-620, Nov. 1978.

Vaporciyan et al., "Periodic Separating Reactors: Experiments and Theory," *AIChE Journal* 35:831-844, 1989.

International Search Report from International Application No. PCT/CA2010/000328, May 2010.

International Search Report from International Application No. PCT/CA2010/001833, Jan. 2011.

International Search Report from International Application No. PCT/CA2010/001859, Jan. 2011.

* cited by examiner

US 8,541,637 B2

PROCESS AND SYSTEM FOR THERMOCHEMICAL CONVERSION OF BIOMASS

CROSS REFERENCE TO RELATED APPLICATION

This application claims the benefit of the earlier filing date of U.S. Provisional Application No. 61/157,877, filed Mar. 5, 2009, which is incorporated herein by reference.

FIELD

The present disclosure concerns a method for converting biomass to useful gaseous and liquid hydrocarbons and more particularly to a method which avoids problems caused by the formation of undesirable tars.

BACKGROUND

Converting biomass into fluid hydrocarbon products is an increasingly relevant activity in order to provide sustainable industry, to minimize use of fossil fuels, and to provide energy and chemical feedstock security. Converting biomass into hydrocarbons can generate a stream of fluid products that is more fungible, economic and transportable than the original biomass. The most advantageous manufactured hydrocarbon products are those that are able to meet existing industrial standards for commodities such as natural gas, natural gas liquids, transportation fuels, alkenes and other exportable products.

Biomass harvesting and transportation is often more costly and energy intensive than fossil fuel feedstock collection. Biomass as grown is also a relatively low density source of chemical energy. This drives the need for biomass conversion processes to efficiently conserve carbon and energy.

Thermochemical conversion of biomass to useful fuel or chemical molecules generally involves a thermal decomposition process, such as gasification or pyrolysis that volatilizes carbonaceous material, plus a chemical process which convert the vapours to an end product. The gasification process generally uses an oxidant, such as air or oxygen, to generate heat by combustion of a portion of the feed biomass in order to provide energy for the initial volatilization of the biomass. Pyrolysis, on the other hand, uses an external source of energy to volatilize the biomass, and does not introduce an oxidant to the process stream. Both methods of volatizing biomass yield a mixture of gases, vapours, aerosols, and solids (char). A substantially fluid stream is processed to form target fuels and chemicals, while the solids generated are separated from the target fuels and chemicals. Pyrolysis followed by rapid cooling of the vapours and aerosols results in the formation of bio-oil.

However, thermochemical conversion practitioners have been plagued with small but significant co-production of viscous, condensable compounds which tend to deposit and adhere to downstream equipment and reactors where the fluid reactant streams cool. These compounds are generally called tars. Tar, for this disclosure, means compounds, typically organic compounds, that are depositable at process temperatures where a deposit can be characterized as a non-flowing liquid, a semi-solid or a solid. Primary tars are formed in the initial volatization process but are somewhat unstable and react chemically or dehydrogenate to form secondary and tertiary tars which are more difficult to react or re-hydrogenate than primary tars. In certain processes, the tars form solid particles of char and are no longer condensable but are still not desirable for commercial use.

A large effort has been made to reduce these tars by various means. Mechanical methods of tar removal include wet scrubbing and filtration. Wet scrubbing can be done at a range of temperatures with a variety of liquids in one or more stages and transfers the problem of tar condensation from the gas phase to a liquid phase. High temperature filtration is typically performed using metallic or ceramic candle filters and, while often effective for char particles, is generally ineffective for tar removal.

Thermal conversion of tars typically requires temperatures greater than 900° C.-1100° C. to achieve high conversion efficiencies. The energy required to attain this temperature is typically derived from oxidation of a portion of the process stream consuming some of the carbon and reducing conversion efficiency.

Another tar reduction method is catalytic conversion. Known catalysts are calcined dolomites and olivine, nickel-based catalysts, zirconium-based catalysts, and precious metal catalysts, with rhodium being the most promising.

In U.S. Pat. No. 4,865,625, Mudge disclosed the introduction of a gaseous oxidizing agent selected from the group consisting of air, oxygen, steam, and mixtures thereof in a catalytic reactor to eliminate tars. However, the addition of an oxidizing agent reduces the conversion rate to hydrocarbons (in this disclosure, conversion to hydrocarbons is the ratio of carbon as hydrocarbons-to-carbon as biomass.)

In U.S. Pat. No. 4,822,935, Scott disclosed a process to produce a methane-rich gas carried out at atmospheric pressure and low temperatures using direct catalytic hydrogasification. The Scott process disclosed a conversion of biomass to methane of 44% to 45% with co-generation of a minimum of 1.33% tar (in this disclosure, tar generation levels are by weight percent of moisture and ash free biomass). In a subsequent published test with different catalysts, with a non-methane hydrocarbon conversion of 22% to 26%, Scott generated between 4% to 7% levels of tar (Radlein, Mason, Piskorz, Scott, "Hydrocarbons from the Catalytic Pyrolysis of Biomass", Energy and Fuels, 1991, 5). In both cases the tar levels are too high for commercial use.

Known methods of converting biomass to hydrocarbons suffer from low conversion efficiency due to tar mitigation solutions. Therefore a need still exists for a high efficiency process for biomass conversion to hydrocarbons.

SUMMARY

The present invention provides a system and method for converting biomass into fluid hydrocarbon products as a potential means for minimizing the use of fossil fuels, and providing energy and chemical feedstock security. At least a portion of hydrocarbons produced using the method and/or system may be exported as a renewable, sustainable and/or carbon neutral fuel and/or feedstock. For example, the exported hydrocarbons may be used for producing renewable, sustainable and/or carbon neutral electric power.

One disclosed embodiment of the present invention comprises performing fast pyrolysis on biomass to produce pygas and char using a maximum processing temperature of about 650° C. The pygas is provided to an independent reactor without the addition of an oxidizing agent for catalytically converting the pygas to hydrocarbons using a maximum processing temperature of about 650° C. Both performing fast pyrolysis and catalytically converting the pygas to hydrocarbon minimizes tar production to less than about 1% of biomass processed relative to amount of tar produced from that biomass. The method also can include adding hydrogen to the catalytic converter. At least a portion of the hydrogen may be added from an external source. At least a portion of the hydrogen also may be produced by steam reformation of at least a portion of the hydrocarbons. Steam used for steam reformation is produced while catalytically converting the pygas to hydrocarbons.

Performing fast pyrolysis may comprise producing a char product. Char contact time with the pygas typically is less than about 5 seconds.

Performing fast pyrolysis also may comprise using a sweep gas. The sweep gas may comprise hydrogen.

Catalytically converting the pygas to hydrocarbons may comprise using a stoichiometric ratio of hydrogen over biomass of over 0.5 and/or a total atomic hydrogen-to-carbon ratio of gas in the reactor of over 4. Catalytically converting the pygas to hydrocarbons often includes using a catalyst. If so, the catalyst contact time with the pygas typically is less than 60 minutes.

Performing fast pyrolysis and catalytically converting the pygas to hydrocarbons may comprise using one or more of a hydrogen partial pressure of from about 0.5 bar to about 100 bar, a process pressure between 2 bara to 100, an operating temperature of between 400° C. and 650° C., a sweep gas, a moving bed, an auger transport mechanism, a char contact time less than 5 seconds, a stoichiometric ratio of hydrogen over biomass of over 0.5, heating media, catalyst cooling, multiple heating vessels operating in staggered phase, gas-solid separators operating above 350° C., and any and all combinations thereof.

The method may involve using a system comprising a biomass pyrolyzer, an independent catalytic converter downstream of the pyrolyzer, and a product purifier downstream of the catalytic converter. The system may further comprise a mineral oil heat exchanger and/or a condenser cooler and/or a pressure swing adsorber downstream of the catalytic converter.

Catalytically converting the pygas to hydrocarbons may comprise using an independent reactor and optionally one or more of a guard bed, a single catalyst, multiple catalysts, catalysts incorporating selective hydrocarbon forming catalyst and a support active for cracking oxygenated hydrocarbons, an operation temperature less than about 650° C., a depolymerization section, a hydrodeoxidation section, a moving bed, fixed beds with valving, a catalyst decoker, and any and all combinations thereof. Catalytically converting the pygas to hydrocarbons also may involve using a methane-forming catalyst, such as nickel on alumina, or another catalyst, such as a light hydrocarbon forming catalyst.

Heating media may be used to perform fast pyrolysis. The heating media typically has a heat capacity greater than 0.3 cal/cm$^3$/K, a weight ratio of heating media to biomass of at least 5:1, a temperature drop following contacting biomass of less than 100° C., and any and all combinations thereof. Examples of heating media include, without limitation, steel, magnetite, or combinations thereof.

Disclosed embodiments of the method may comprise fast pyrolysis, independent catalytic conversion and hydrogen recycle.

Disclosed embodiments of the method may further comprise using char from the pyrolysis process to heat a hydrogen generating reformer.

Disclosed embodiments of the method may further comprise using a product purifier export-to-feed hydrocarbon ratio for controlling hydrogen stoichiometric ratio in the conversion reactor.

A particular embodiment of the method for producing hydrocarbon from biomass minimizes tar production to less than about 1% of biomass processed relative to amount of tar produced by that biomass. This embodiment includes performing fast pyrolysis on biomass to produce pygas and char using a maximum processing temperature of about 650° C. and a sweep gas comprising hydrogen. The pygas is provided to an independent reactor without addition of an oxidant for catalytically converting the pygas to hydrocarbons using a maximum processing temperature of about 650° C. Catalytically converting the pygas to hydrocarbons comprises using a stoichiometric ratio of hydrogen over biomass of over 0.5, and a hydrogen partial pressure of from about 0.5 bar to about 100 bar. This embodiment may further comprise adding hydrogen to the independent reactor. At least a portion of the hydrogen may be added from a source external to the system. And at least a portion of the hydrogen may produced by steam reformation of at least a portion of the hydrocarbons, where the steam is produced during production of the pygas.

Yet another embodiment of the method concerns a process for hydrogenating a material in a conversion reactor. This embodiment comprises hydrogenating a first portion of the material in a conversion reactor to produce a hydrogenated product. A portion of the hydrogenated product is separated in a separator downstream of the conversion reactor to provide a separated hydrogenated product portion. The method further comprises recycling residual hydrogen and remaining hydrogenated material back to the conversion reactor, where the separated hydrogenated product portion is selected to control a hydrogen-to-material ratio in the conversion reactor.

The present invention also concerns a system for producing hydrocarbons from biomass that minimizes tar production to less than about 1% based on mass of biomass processed and amount of tar produced. One disclosed embodiment the system comprises fast pyrolysis means operating at a process temperature of less than 650° C. for producing a pygas and char, independent catalytic conversion means downstream of the fast pyrolysis means operating at a process temperature of less than 650° C. for converting the pygas to hydrocarbons, and a hydrogen source for adding hydrogen to the independent catalytic conversion means. Hydrogen may be produced by a steam reformer by steam reformation of at least a portion of the hydrocarbons. The fast pyrolysis means may include a hydrogen sweep gas. The fast pyrolysis means and catalytic conversion means operate at one or more of a stoichiometric ratio of hydrogen over biomass of over 0.5, a total atomic hydrogen-to-carbon ratio of gas in the reactor of over 4, and a hydrogen partial pressure between 0.5 bar to 100 bar in both the fast pyrolysis means and the catalytic conversion means. The system also operates at a suitable pressure, such as between from about 2 bara to about 100 bara.

The system may further comprise tar minimization means downstream of the catalytic conversion means. The tar minimization means may comprise, for example, a mineral oil heat exchanger operating with a high boiling fraction of a paraffinic hydrocarbon mixture and an oil separator.

For certain disclosed embodiments of the system the independent catalytic conversion means optionally includes one or more of a guard bed, a single catalyst, multiple catalysts, catalysts incorporating selective hydrocarbon forming catalyst, such as a methane-forming catalyst or a light hydrocarbon forming catalyst, and a support active for cracking oxygenated hydrocarbons, a depolymerization section, a hydrodeoxidation section, a moving bed, fixed beds with valving, catalyst decoker, and any and all combinations thereof.

For certain disclosed embodiments of the system the fast pyrolysis means operates at or includes one or more of an operating pressure of less than 100 bara, an operating temperature of between 400° C. and 650° C., a sweep gas, a moving bed, an auger transport mechanism, a char contact time less than 5 seconds, a hydrogen partial pressure between 0.5 bar to 100 bar, heating media, such as steel or magnetite, a heated media contact temperature of less than 650° C., and any and all combinations thereof. The fast pyrolysis means heating media may have a heat capacity greater than 0.3 cal/cm$^3$/K, a weight ratio of heating media to biomass of at least 5:1, and combinations thereof. If the heating media is magnetic magnetite particles, then the magnetic properties of the particles may be used in a char separator. Moreover, magnetic magnetite particles may be used in combination with a steam iron process to generate hydrogen in a pyrolysis section.

A particular embodiment of the system for producing hydrocarbons from biomass that minimizes tar production to less than about 1% based on mass of biomass processed and amount of tar produced comprises a biomass fast pyrolyzer operating at a process temperature of less than 650° C. The system uses a sweep gas comprising hydrogen for producing a pygas and char. The pyrolyzer includes heating media. An independent catalytic converter is positioned downstream of the fast pyrolyzer and operates at a process temperature of less than 650° C. and without addition of an oxidant for converting the pygas to hydrocarbons. The system also includes a hydrogen source. Catalytically converting the pygas to hydrocarbons comprises using a stoichiometric ratio of hydrogen over biomass of over 0.5, and a hydrogen partial pressure of from about 0.5 bar to about 100 bar.

Another particular embodiment of the system operates at a pressure between 2 bara to 100 bara for producing hydrocarbons from biomass that minimizes tar production to less than about 1% based on mass of biomass processed and amount of tar produced. This embodiment of the system comprises a biomass fast pyrolyzer operating at a process temperature of less than 650° C., uses a sweep gas comprising hydrogen for producing a pygas and char, an independent catalytic converter downstream of the fast pyrolyzer operating at a process temperature of less than 650° C. for converting the pygas to hydrocarbons, and a steam reformer fluidly coupled to the catalytic converter for producing hydrogen from at least a portion of the hydrocarbons. Performing fast pyrolysis and catalytically converting the pygas to hydrocarbons comprise using a stoichiometric ratio of hydrogen over biomass of over 0.5, and a hydrogen partial pressure of from about 0.5 bar to about 100 bar.

Yet another particular embodiment of the system operates at a pressure between 2 bara to 100 bara for producing hydrocarbons from biomass that minimizes tar production to less than about 1% based on mass of biomass processed and amount of tar produced. This embodiment of the system comprises a biomass fast pyrolyzer operating at a process temperature of less than 650° C. that uses a hydrogen containing sweep gas for producing a pygas and char, an independent catalytic converter downstream of the fast pyrolyzer for converting the pygas to hydrocarbons, a product purifier downstream of the catalytic converter for withdrawing a portion of the hydrocarbons for export, and a steam reformer fluidly coupled to the product purifier for producing hydrogen from at least a portion of the hydrocarbons. Catalytically converting the pygas to hydrocarbons comprise using a stoichiometric ratio of hydrogen over biomass of over 0.5, and a hydrogen partial pressure of from about 0.5 bar to about 100 bar. Performing product purification using the system may comprise recycling excess hydrogen back to the fast pyrolyzer and catalytic converter.

The foregoing and other objects, features, and advantages of the invention will become more apparent from the following detailed description, which proceeds with reference to the accompanying figures.

DETAILED DESCRIPTION

Biomass, in this disclosure, is organic matter derived from plant material such as trees, peat, plants, refuse, algae, grass, crops, crop residue, municipal sludge, manure and the like. The biomass can be pre-processed into pellets, briquettes, or other shapes, slurries, admixtures or thermally modified by torrefaction or reduced into bio oils or any other altered form or mixture as substantially derived from plant materials.

Figure 1:
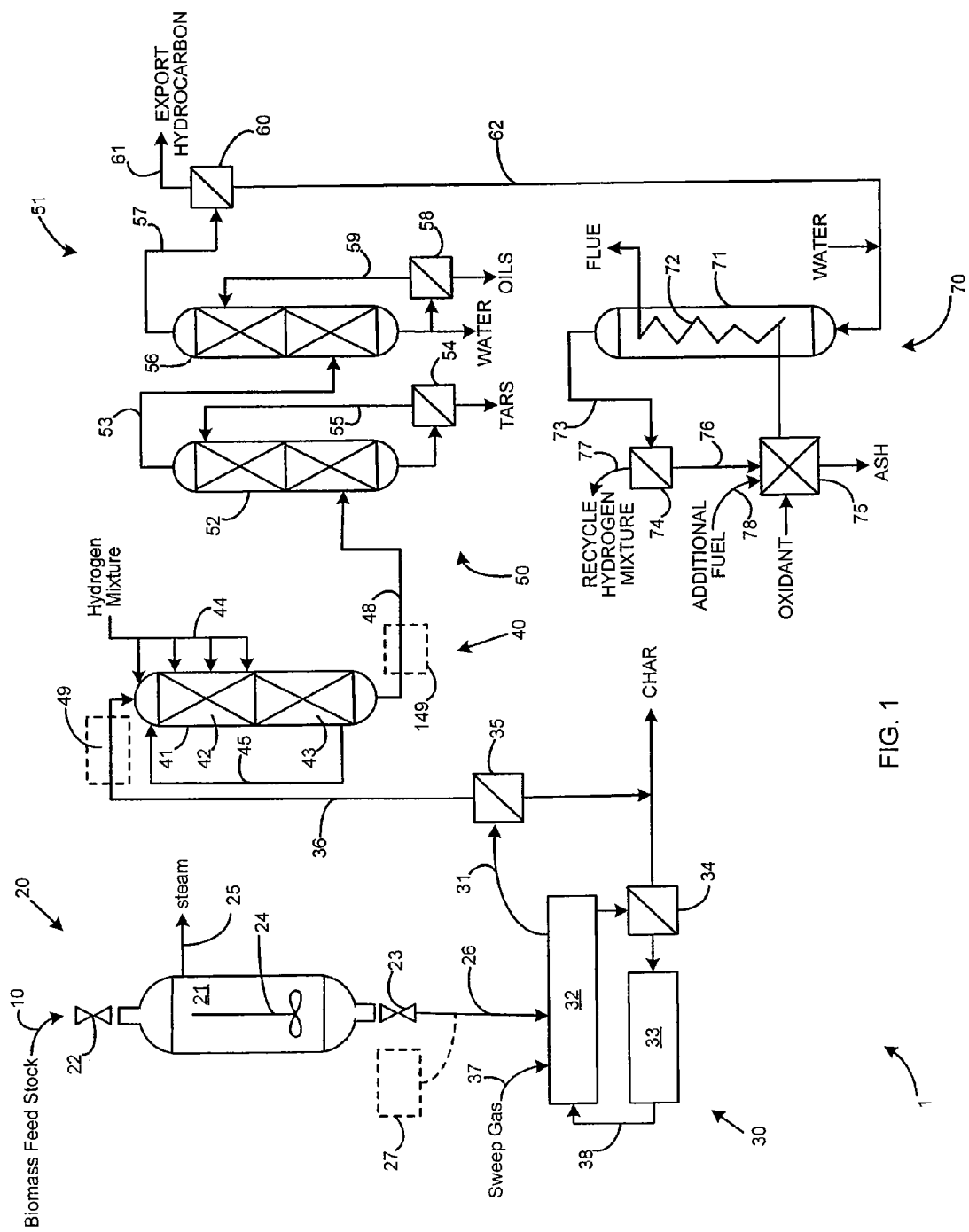
FIG. 1 is a schematic drawing of one disclosed embodiment of a biomass conversion plant.

A biomass conversion plant 1 is shown in FIG. 1. Biomass feedstock 10 is reduced in particle size by equipment like chippers, grinders or hog mills (not shown) as is well known by those of ordinary skill in the art. Target particle size ranges from greater than 0 mm to at least about 200 mm, such as greater than 0 mm to about 100 mm, and generally from about 0.1 mm to about 10 mm. Foreign objects such as stones, dirt, metals are substantially removed by commercially available equipment. The feedstock is dried and pressurized in feed device 20. Typically, biomass drying is performed by passing the feedstock through a warm gas stream to drive off moisture to a range of from about 2% to about 50%, generally from about 5% to about 20%, and most typically to about 10%, with a moisture by weight. Biomass 10 is subsequently brought into the pressurized system 20 using any suitable mechanism, such as a set of lock hopper, screw or ram mechanisms as is well known to those of ordinary skill in the art of handling finely divided solids at elevated pressures. In the case of a liquid mixture containing biomass, a pump may be used to bring the feedstock to operating pressures.

A preferred embodiment of feed device 20, as shown in FIG. 1, is to place moist feedstock 10 into lock hopper pressure vessel 21 through open valve 22. Upon filling, valve 22 is closed and the vessel 21 is purged of entrained air. One purging process is to subject the vessel 21 to vacuum withdrawal of entrained air. An optional process is to heat the biomass 10 within the vessel 21 so as to generate steam as the biomass is drying. This steam is used to purge the entrained air as the steam air mixture is vented from the vessel 21. Once purging is complete, as the oxygen and nitrogen content in the exiting purge stream is reduced to acceptable concentrations, the vessel 21 is isolated and pressurized to the operating pressure of pyrolysis reactor 30. One pressurization option uses the steam generated by further heating of the biomass to cause the pressure to rise. In another embodiment, hydrogen from an optional parallel lock hopper pressure vessel 27 which has completed the feed process is used as an equalization gas to bring the pressure above atmospheric conditions. Subsequent isolation from the parallel vessel and heating of the biomass 10 generates steam pressure.

The biomass 10 can be heated via direct or indirect heat exchange with a hot process stream or other heat source. A preferable option uses the wall of pressure vessel 21 as the heat exchange surface. An internal mixer 24 is optionally used to increase the heat transfer rate to the biomass 10. A mixer 24 which agitates, scrapes or sweeps at the wall of vessel 21 is preferably used. An optional milling operation to reduce the size of the biomass particles may be provided in addition to the mixer function. Another option uses the surfaces of a transfer device, such as an auger and tube arrangement, as the heat exchange surface.

The biomass 10 may be heated to a range of about 100° C. to about 200° C., and pressure is regulated to meet the system pressure of the process by releasing excess steam 25. The released steam 25 may be reutilized in the process where steam is required, or advantageously used, or may be exported to an external destination.

Another option is for biomass feed stream 10 to be a mixture of water and biomass. Gravity separation of entrained metals, rocks and such may be performed with this mixture. Once vessel 21 is filled and isolated, water can be drained providing the purging action required for eliminating air. Subsequent heating of the biomass 10 is performed to reduce the moisture content.

Remaining moisture content of the biomass 10 is between 0.1% by weight to 30% by weight, preferably between 2% to 10%. Valve 23 is opened to allow the biomass 10 to exit the vessel and enter into the pyrolyzer 30. The pressurized biomass stream 26 can be withdrawn by gravity or by a solids conveyor, such as a screw conveyor, as is well known in the art. Optional heating of the biomass 10 may be performed by feed device 20 by heat transfer to the biomass particles during passage in the exiting solids conveyor. When vessel 21 is substantially empty of biomass, valve 23 is closed and the vessel is brought back to atmospheric pressure. The process of opening valve 22, flowing biomass through valve 22 into vessel 21, purging entrained air gases, heating the biomass to the temperature and reducing the moisture content, regulation of steam and pressure, opening of valve 23 and withdrawing biomass, closing of valve 23, and reducing pressure to atmosphere is repeated in a cyclic manner.

Multiple heating vessels operated in parallel can be sequenced to create an essentially continuous biomass feed stream into the process. A minimum of two vessels operating in staggered phase is required for continuous feed, with one vessel on stream and the other vessel in the process of depressurization, recharge, purge, or heating. Pressure equalization between two vessels can be performed to conserve hydrogen found in the emptied vessel. Secondary surge vessels may be used to provide even flow rates to the pyrolyzer.

The pyrolysis of biomass is performed by raising the temperature of the biomass to between about 400° C. and about 650° C., preferably between about 450° C. and 500° C. in the absence of oxygen gas. The pyrolysis reactor 30 converts the biomass 10 into primary pyrolysis products, namely gases, vapours and aerosols, hereafter referred collectively as "pygas," and char via thermally induced self-decomposition. Pygas is a substantially gaseous mixture containing entrained aerosols and solid particulates. In general, ash chemicals, such as silica, potassium and calcium compounds, remain in the char and are not volatilized with the carbon-based molecules. Cellulose, hemicellulose, lignin, resins, oils and extracts are mostly volatilized with the co-production of char. Sulphur is generally preferentially partitioned to the gas phase, while phosphorous compounds preferentially partitioned to the char phase with nitrogen compounds portioned between both phases. Pyrolysis yield of char is affected by the time required to heat the biomass. A preferred embodiment is pyrolysis of less than about 10 seconds, referred to as fast pyrolysis, to minimize char formation. In general, fast pyrolysis is characterized by a bulk biomass heating rate of at least 40° C. per second. The pygas and any entrained fluidized char are withdrawn from the reactor in conduit 31. The pyrolysis reactor can be operated at pressures from atmospheric conditions to 100 bara, more preferably from 5 bara to 30 bara.

The formed char is catalytic to the dehydrogenation and other reactions of pygas, creating additional secondary char and secondary condensable products such as heavy aromatic compounds. Secondary tar formation increases with process severity including both process temperature and residence time. Process severity is reduced by reducing contact time between the formed primary char and the generated primary pygas. An inventive feature is that the char contact time with the pygas is less than 5 seconds, preferably less than 2 seconds, and more preferably less than 1 second.

A preferred option for reducing contact time between primary chars and vapours is the use of a sweep gas to produce a pyrolysis vapour/sweep gas mixture. The sweep gas is preferentially hydrogen or a hydrogen rich gas containing other inert or reactive gases such as steam, $CO_2$ or CO. Any oxygen gas is preferably minimized to below 1% by volume. The sweep gas stream 37 enters heating section 32 and exits in conduit 31.

A hydrogen atmosphere inhibits reactions of the tar formation process. Preferred operation of the pyrolysis reactor includes a hydrogen partial pressure in a range of from about 0.5 bar to about 100 bar, more preferably in a range of from about 2 bar to about 30 bar. Without being bound by theory, it is believed that the elevated hydrogen partial pressure reduces both the concentration of oxygenated free radicals and the dehydrogenation of aromatic ring and other compounds released by the thermally induced decomposition.

The pyrolysis is optionally performed with compounds added to the biomass or using catalytic media intended to enhance the gas formation rate of the biomass during pyrolysis. Catalysts are used to enhance the approach to chemical equilibrium and can favour selective conversion pathways or reduce poisons. Optional catalyst systems may include biomass impregnation by metal oxides or hydroxides, heating media coated with metal catalyst such as nickel, or mixed catalyst with the biomass. In some embodiments, a sulphur removal material such as nickel, chromium, molybdenum, or other transition metal with a high sulphur affinity may be coated or impregnated onto the heating media to remove sulphur from the pygas. In other embodiments, a chloride reacting material, such as calcium oxide or other alkali earth oxide may be impregnated on the surface of the heating media in order to remove chloride from the pygas.

Another method of reducing the process severity is to minimize localized temperatures in the reactor 30. Secondary tars are formed more easily with increased temperature. An inventive feature is to keep the temperature of the pygas and char products below 650° C. and preferably below 600° C. A preferred option is the use of a heating media to transfer heat to the biomass 10, where the heating media is heated in a separate, temperature-controlled process to a target temperature, such that the heating media temperature at time of contact with the biomass is at most 650° C., thereby ensuring the biomass pyrolysis products are not overheated. The preferred temperatures of the pyrolysis process greatly reduce the formation of any polyaromatic hydrocarbons and any dioxin precursor compounds compared with higher temperature pyrolysis or gasification methods known in the art. Polyaromatic hydrocarbons and dioxin compounds are known toxins and carcinogens.

Many equipment designs are capable of performing fast pyrolysis. These include but are not limited to bubbling and circulating fluid beds, transported beds such as screw and rotating cone reactors, and ablative reactors. In a preferred embodiment, a twin screw reactor operating in a pressurized mode is used with recirculating heating media and a hydrogen-containing sweep gas.

In the optional transported bed reactor the hot heating media stream 38 is brought in contact with the biomass 10 in biomass heating section 32 in a weight ratio of preferably at least 5:1 and more preferably at least 10:1. Preferable temperature drop in the heating media is less than 200° C. and more preferably less than 100° C. Heating media can be any free flowing mass of abrasion-resistant particles such as silica sand. The media is preferably of a shape and surface consistency such that the angle of repose of clean media is less than 45 degrees and more preferably less than 15 degrees so as to minimize bridging and channeling flow defects. In a preferred option the media are round balls. The media size may be in the range of 0.1 mm to 5 mm in diameter, and preferably have a narrow size distribution. Materials having volumetric heat capacity over 0.3 cal/cc/K, such as steel, iron oxide or high magnesium-oxide-containing minerals, are preferred. Magnetic materials such as magnetite or iron with Curie point above the maximum heating media temperature (during reheat) are further preferred to enable magnetic separation techniques.

The entrained char and reduced temperature heating media are sent to char separation device 34. Any refractory objects such as stones that passed through the initial sorting process will also be separated from the recirculating heating media. Equipment for separating dissimilar solids by size or density differences or other properties is described in the literature and therefore familiar to those of ordinary skill in the art. The magnetic properties of the optional magnetite heating media can be used as a separation characteristic.

The media reheat section 33 is optionally an auger transport system with external heating of the containment tube. Media reheat can also be performed by direct contact with heated gases such as oxidation reactant. Additional valves may be used for a system using hydrogen-containing sweep gas. One embodiment uses heated hydrogen gas as a direct contact reheating gas. Another option is to use the hydrogen reheating gas as the optional sweep gas after passing through section 33.

In one embodiment the heating media material is chemically reducible with carbon monoxide, carbon, char, or other carbonaceous compound in the reheat section 33. This reduced form is oxidized by contact with water vapour to form hydrogen gas in the pyrolysis heating section 32. The material may be iron oxide, where the embodiment disclosed is the well known steam iron process.

The heating media, after providing heat energy in the pyrolysis reactor, may also be used as a heat media in the feed device 20 prior to reheating.

The pygas along with any sweep gas and any entrained solid particulate are withdrawn from section 32 through conduit 31, leading to a gas-solid separator device 35. Typical devices used for this separation are cyclones and filters, and are well known by those of ordinary skill in the art. The separation equipment 35 is kept at temperatures above about 350° C. to ensure the pygas does not condense.

The pygas and optional sweep gas less entrained solids is introduced by conduit 36 to conversion reactor 40, comprising at least one pressurized vessel 41 containing at least one catalyst located in at least one conversion section 42. The gas stream in conduit 36 may be heated or cooled by a heat exchanger (not shown) to suit a target entrance temperature of the conversion reactor 40. The reactor used may be a fixed bed, moving bed, or fluidized bed unit. Passage of the pyrolysis vapours through reactor 40 results in the production of water, methane, and other hydrocarbons by catalytic reaction of the pyrolysis vapours and the hydrogen gas. The resulting gaseous mixture is substantially free of tars and mostly consists of carbon oxides, methane, other hydrocarbons, hydrogen and water.

Optionally a guard bed section 49 is upstream of the main catalyst bed. The guard bed section can be located inside vessel 41 or can be in a separate vessel to allow easier change out of guard materials. Many catalysts are susceptible to poisoning by sulphur, alkali and other materials found in biomass. A guard bed of material that captures or converts poisoning compounds by, for example, sorption or reaction, is optionally placed upstream of the conversion catalyst. Preferably, the material is non-catalytic to the cracking of oxygenated compounds contained in the gas mixture so as to avoid carbon deposition. A guard bed may be unnecessary if a sulphur-tolerant catalyst is used.

Pygas is known to be a complex mixture of several hundred chemical compounds including oxygenates and aromatic rings. The chemical constituents differ significantly depending on the source and the larger molecular fragments are the primary source for tars. The lighter oxygenated compounds are quickly cracked and reacted to form methane over an appropriate catalyst. The conversion reactor 40 contains a catalyst or catalyst mixture that is active for cracking oxygenated compounds and active for hydrogenation reactions. One hydrogenation example is the formation of methane by reaction (1):

$$CO + 3H_2 \rightarrow CH_4 + H_2O \tag{1}$$

where CO is previously produced by the cracking of oxygenated compounds in the pygas. The catalyst or catalyst mixture is also active for deoxygenation reactions using hydrogen. A simple example, without limiting the scope of the invention, is methanol reacting with hydrogen to produce methane and water (2) through complex catalytic pathways:

$$CH_3OH + H_2 \rightarrow CH_4 + H_2O \tag{2}$$

However, lignin derived oligomers and large molecular fragments are more difficult to crack and fully decompose to be able to form methane. Lignin is a large, complex biopolymer consisting of linked aromatic rings often containing beta-ether bonds. This is significantly different from cellulose and hemi-cellulose which both contain oxygen within their primary repeating rings. It is not necessary to fully decompose the lignin oligomers and lignin fragments down to non-condensable gases but is sufficient to fragment poly-aromatic oligomers and to form low boiling point mono-aromatic hydrocarbons or phenolic compounds which are not tars. Another functionality of the catalyst or catalyst mixture is carbon-carbon bond scission, an example being the cracking and hydrogenation of aromatic and phenolic compounds to non-cyclic compounds, reducing tars. Hydrogenation of aromatic compounds to cyclic alphiatic compounds reduces tars.

Reforming or methanation catalysts, containing chromium, molybdenum, tungsten, nickel, iron, cobalt, or a similar metal from Group VI-B, or the iron group from the Periodic Table, supported upon a refractory oxide carrier, such as alumina, silica, zirconia, kieselguhr, kaolin, attapulgus clay, hafnia, boria or mixtures thereof may be used. Such catalysts are often promoted by the addition of alkali or alkaline earth metals such as lithium, sodium, potassium, cesium, rhenium, rhodium, rubidium, beryllium, ruthenium, iridium, magnesium, calcium, strontium, barium and the like. One such catalyst comprises a catalytically active nickel on an alumina support. Hydrodeoxygenation catalysts may include sulfided catalysts or mixtures of molybdenum and nickel or cobalt on a zeolitic or amorphous silica-alumina support.

In certain embodiments other catalytic processes using, for example, hydrodeoxygenation, hydrotreating or hydrocracking catalysts, are used to convert a portion of the pygas into hydrocarbon molecules other than methane. These other hydrocarbon compounds require less hydrogen per carbon atom, reducing the demand for hydrogen production. Catalysts may perform ring-opening functions, deoxygenation functions such as decarboxylation or decarbonylation, hydrodeoxygenation, or hydrogenation to produce saturated or unsaturated hydrocarbons or BTEX aromatic compounds.

Lignin thermal depolymerisation reactions require significantly longer reaction times than light oxygenates cracking and reaction with hydrogen gas to form methane. This may be accomplished by using a dual-section catalyst bed with the first section having a short gas residence time in which the bulk of the methane is produced and the second section of the catalyst bed having a much longer gas residence time at an elevated temperature to enhance the thermal de-polymerisation of residual lignin oligomers existing as vapours or aerosols. In certain embodiments the two stage process may be utilized by using the same catalyst mixture in both stages, where the methanation stage is operated at a lower temperature between about 400° C. to 600° C. and the second downstream de-polymerization stage is operated at a higher temperature between about 500° C. to 650° C., where the heat of methanation is carried into the second stage to raise the operating temperature. In embodiments of the two stage process using the same catalyst mixture in both stages the mass of catalyst in the methanation stage is less than that of the de-polymerization stage.

Aerosols are difficult to deal within a solid-gas heterogeneous catalytic system. A portion of the larger diameter lignin aerosols will impact and adhere to catalyst particle exterior surfaces. These deposits slowly react with both hydrogen and steam over time. Small diameter aerosols tend to react faster with the hydrogen and steam present. A preferred embodiment is a greater than 60 second contact time of the depoymerization section catalyst to a hydrogen steam gas mixture at over 550° C. A circulating fluidised bed is an option using a fluidised bed as the methane forming section which overflows catalyst into a quasi-fixed moving bed with over flow catalyst returned to the fluidised bed after extended time exposure in the second stage. A riser reactor configuration is a preferred option.

In certain embodiments of a multi-stage process, the first catalyst is chosen to perform at least a methanation function and a second catalyst is chosen to perform a hydrodeoxygenation function. The reactor 40 may consist of two vessels housing different catalyst combinations.

In certain embodiments of conversion reactor 40, at least a third stage catalytic process may be utilized to further process any aromatic compounds. In some instances the aromatic compounds may be separated from the converted hydrocarbon mixture prior to introduction to a subsequent catalytic process. In certain embodiments of conversion reactor 40, the at least third stage process may be performed while the hydrocarbons are in a liquid state.

Each of the multiple compounds in biomass pyrolysis vapour has an associated heat of formation and a free energy of formation from carbon, hydrogen and oxygen. It has been discovered that the overall heat of reaction within the catalyst bed is significantly lower than what would be observed for the reaction of syngas (a mixture of hydrogen and carbon oxide gases, as is well known in the art) to hydrocarbons. A low temperature rise in the catalytic bed allows operation below 650° C. outlet temperature. Without being bound by theory, it is believed that the cracking of pygas compounds requires heat, which is supplied by the formation of the hydrocarbon product gases. Thus the cracking reactions and product formation reactions are thermally coupled within the catalyst bed. Conversion reactor 40 may include cooling apparatus to control the conversion process. The preferred temperatures of the conversion process greatly reduce the formation of any polyaromatic hydrocarbons and any dioxin precursor compounds, where the polyaromatic hydrocarbons and dioxin compounds are known toxins and carcinogens.

Figure 2:
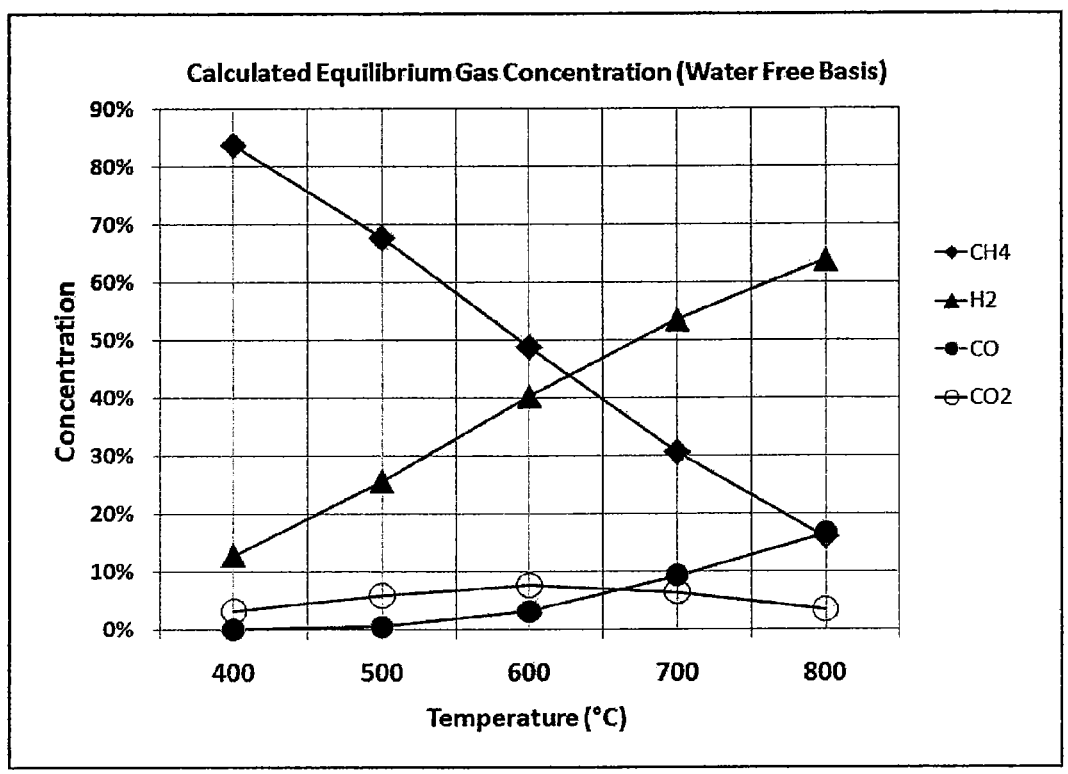
FIG. 2 is graph of concentration (%) versus temperature (° C.) illustrating calculated equilibrium gas concentrations.

It is preferable that the conversion is performed at temperatures below those required for gasification and production of syngas in order to retain the hydrocarbons produced and avoid or reduce their reaction with steam via a reforming type reaction. Calculated equilibrium gas concentrations are shown in FIG. 2 and are based on a typical reacted pygas plus hydrogen gas mixture typical of the disclosed process at 10 bara. FIG. 2 presents the equilibrium on a water-free basis representing the gas composition if rapidly cooled to condense water and kinetically inhibit conversion reactions. It is evident from FIG. 2 that operation of the catalyst bed below 650° C., and more preferably below about 550° C., is required to retain methane in the output gas mixture. Co-conversion to hydrocarbons with lower boiling points than the parent compounds in pygas is enhanced at lower temperatures. The operating temperature of the conversion reactor 40 is independent of the pyrolysis reactor 30 operating temperature, so it is designated as an independent conversion reaction and reactor.

The nominal stoichiometric hydrogen number S, based on a representative biomass composition of $C_6H_9O_4$ and full conversion to methane, is related to reaction 3:

$$C_6H_9O_4 + 11.5H_2 \rightarrow 6CH_4 + 4H_2O \qquad (3)$$

S is defined as the mass ratio of added hydrogen to dry biomass multiplied by 6.30. The dry biomass refers to the mass (moisture and ash free basis) of biomass 10 entering pyrolysis reactor 30, while the added hydrogen refers to the mass of hydrogen gas entering the localized conversion process consisting of the boundaries of reactor conversion zone 42. Reaction 3 thus exhibits a stoichiometric ratio S of 1.0. Hydrogen gas may be introduced into the at least one conversion section 42 through conduit 36 or through any other inlet to reactor 40. A preferred embodiment introduces additional hydrogen as a component of a mixed gas via conduit 44 at or near the entrance to section 42. This mixed gas may act as a coolant to absorb some of the heat from the exothermic hydrocarbon formation reaction (3). Multiple entrances of conduit 44 arranged in sequentially downstream positions are contemplated as additional cooling processes. In one disclosed embodiment of the present invention a preferred range of S values is 0.3 to 5, and a more preferred value of S is between 0.5 and 2. Higher values of S drive the conversion process toward hydrocarbon and water production. Hydrocarbons other than methane require less hydrogen for complete conversion and therefore a reduced value of S. Incomplete conversion generally results in a portion of products as carbon oxides and oxygenated hydrocarbons.

It is important to provide an excess of hydrogen in the conversion reactor 40 to maximize conversion of oxygenates, tars, and aerosols. Some of the biomass shown in reaction (3) will become char in the pyrolysis process, reducing the amount of available carbon convertible to a hydrocarbon. A value of S=1 would provide an excess of hydrogen in the conversion reactor with a loss of carbon to char in the pyrolysis reactor. An excess of hydrogen will move the equilibrium of reactions (1) and (2) to enhance forming of hydrocarbon and water. Unreacted hydrogen is preferably captured and recycled in order to reduce losses in efficiency and valuable reactant.

The conversion of pyrolysis vapours to hydrocarbons is augmented with high hydrogen partial pressure. A pressurized system also increases the contact time of the process fluids with the catalyst bed for a given feedstock mass flow to catalyst mass ratio. A lower actual velocity and longer residence time in the catalyst bed increases the conversion of primary tar vapours and aerosols to hydrocarbons. The bulk of the catalytic reaction of pygas to form hydrocarbons occurs quickly within about a few seconds or less. As such, the residence time of the pygas in the conversion reactor 40 is independent of the residence or contact time in the pyrolysis reactor 30. The preferred mode of operation is a pressurized catalyst reactor of between 2 bara to 100 bara, more preferably between 5 bara and 50 bara, and most preferably between 8 bara and 25 bara. The contact time for any of optionally multiple streams in any multiple of conversion sections 42 may be less than 1 hour and more preferably less than 1 minute.

The conversion of the bulk or at least a significant fraction of the pyrolysis vapours to methane results in the release of heat. The exothermic reactions result in increased gas temperatures downstream of the methanation reaction zone. It is preferred that downstream reactor gas temperatures are maintained below about 650° C. to prevent the formation of secondary tars.

The catalytic conversion of the pyrolysis vapours may also result in the deposition of carbon (coking) on the surface of the catalyst. This contamination typically plugs microscopic pores in the catalyst, causing catalyst blinding and loss of activation sites. In one preferred embodiment to reduce coking, the total atomic hydrogen-to-carbon ratio of all gas mixtures is at least four, and more preferably at least five throughout the conversion section 42. Physical deposition of aerosols on the catalyst may also result in carbon on the surface of the catalyst. The aerosols are generally polymeric and require depolymerization for removal from the catalyst surface. Catalyst de-coking by steam reaction is a well known process to those of ordinary skill in the art, and a decoking process, or processes, is included in the disclosed embodiments.

Onstream or offstream de-coking of the catalysts may be utilized to lengthen the time of catalyst usage. In one preferred embodiment, moving bed technology is utilized with catalyst material moving down through a conversion section 42, and into decoking section 43. Decoking section 43 may be a different size and present a different residence time for the catalyst. In the preferred embodiment, pygas enters the conversion section 42 via conduit 36, is converted, and the resultant converted gases are passed through decoking section 43 in cocurrent flow. The converted gas mixture, containing at least one of hydrogen, steam, oxygen, or a carbon oxide, flows through the decoking section 43. Carbon is reacted with the gas and is generally carried as a carbon oxide or a hydrocarbon. The catalyst has a reduced coke level as it reaches the end of section 43, and is transported to the beginning of conversion section 42 by transport mechanism 45 to restart flowing down through the conversion section 42. Transport mechanism 45 may be a screw-type conveyor, a bucket-type conveyor, fluid riser or any other solids conveying device either inside or externally to vessel 41. Optional decoking section 43 may also be partially or wholly within mechanism 45. Optionally, conversion section 42 may occur partially or wholly within mechanism 45, with downward flowing catalyst occurring in the decoking section 43. Alternative embodiments using multiple fixed catalyst beds and a valve system sequencing flow to create alternating conversion and decoking section functions as well as fluidized bed systems are contemplated. Additional sections may be included such as a secondary conversion section, a depolymerization section, or any other catalytic activity section. Any optional additional sections may be located in the same reactor vessel 41 or a separate vessel 149, may include heat transfer to condition the gas temperature to a preferred inlet temperature different from the outlet of the previous section, may use the same or a different catalyst and substrate, and may use the same or an independent recirculation method of de-coking if required.

The converted gas mixture consisting of carbon oxides, hydrogen, water and hydrocarbons exits the conversion reactor 40 in converted gas conduit 48 and is transferred to product purifier 50. The generated tar content in this mixture will be less than about 1%. Product purifier 50 extracts at least one exportable product from the converted gas mixture in purification section 60.

One option is to cool the converted gas mixture and extract exportable products at appropriate operating temperatures of the contained separation process units. In one embodiment, product purifier 50 contains cooling section 51. A single or a series of heat exchanger units can be employed. In one preferred embodiment the cooling section 51 includes a two-stage process where the first hotter stage includes a direct contact heat exchanger using a liquid such as mineral oil as the coolant and the second stage includes a direct contact heat exchanger using liquid water as the coolant. A first indirect heat exchanger (not shown) is preferably used prior to the mineral oil cooler to reduce the cooling load on the oil and to provide high grade heat. It is preferable to keep the indirect heat exchanger surface temperature above approximately 350° C. to minimize condensation of any potential tars in case of process upset.

The liquid in oil cooler vessel 52 condenses any high boiling point hydrocarbons and also acts as a scrubbing material for the converted gas mixture to scrub any remaining tars, aerosols, dust, ash, and solids from the gas mixture. The oil cooler generally cools the converted gas mixture from an inlet temperature range of between the conversion reactor exit temperature to 300° C. to an exit gas temperature range of between 250° C. to 100° C. It is preferable for the exit temperature of stream 53 to be above the condensation temperature of the steam in the converted gas mixture, which is dependent on the specific process conditions of the biomass conversion plant 1. Any scrubbed tars and heavier hydrocarbons are subsequently removed from the liquid stream 55 by oil separator 54. The stream 55 is preferably cooled and recycled back to the cooler 52. A preferred liquid is a mineral oil consisting of the high boiling fraction of a paraffinic hydrocarbon mixture where the fraction with a boiling point of less than about 250° C. is substantially removed prior to use.

The preferred direct contact heat exchanger using water as coolant preferably condenses steam and separates it from the converted gas mixture. The temperature of condenser vessel 56 exit stream 57 is preferably between 90° C. to 1° C. and more preferably between 70° C. to 20° C. A proportion of any carbon dioxide in the converted gas mixture will be absorbed by the liquid water stream 59, where a flash unit (not shown) may be utilized to separate this $CO_2$ from the water. Generally an oil/water separator 58 is utilized to separate and recover any carryover oil from the mineral oil heat exchanger and then returned to the oil cooler process. The oil/water separator 58 can also separate out any condensed hydrocarbons. A portion of the water is preferably cooled and recycled back to the condenser vessel 56. System make up water can optionally be added at this point. Further, for relatively cool make up water, this water can assist in cooling the recycling water.

Condensing steam will continually add water to the recirculating stream 59. A portion of the condensed water stream 59 can optionally be sent for use as water feed in an optional steam reformer. This may eliminate any water effluent and any costly water treatment facility. Non-tar phenolic compounds may optionally be removed from the condensed water stream and further treated by conventional methods prior to use as feed water for the optional steam reformer. Optionally any phenolic or other hydrocarbon type compounds which are difficult to remove from the water stream may be kept within the water stream and further cracked in a pre-reformer (not shown) prior to entering steam reformer vessel 71. The pre-reformer is an optional component of the reformer 70. A pre-reformer is well known to those skilled in the art. A preferred option uses all of the condensed steam as water reactant in a steam reformer by keeping the recirculating stream 59 at a constant flow.

A final indirect heat exchanger (not shown) is optionally used after the condenser 56 to further cool the converted gas mixture 57 to an advantageous temperature and moisture content for entering the downstream purification section 60. Process cooling may be performed by any system well known in the art. Systems may include a flow through, closed loop or combined cooling fluid system using water or other liquid, or may also include gas cooling or evaporative cooling devices.

The purification section 60 can use adsorption, membranes, cryogenics, absorption or other methods well known to those of ordinary skill in the art. The purification unit 60, in one or more stages, using one or more methods, separates a product stream 61 consisting of substantially gaseous hydrocarbons from the converted gas mixture. Secondary products may also be separated, such as a product stream of light alkanes or alkenes or other saleable hydrocarbons. In certain embodiments a reject gas mixture 62 comprising some or all of the converted gas mixture components not withdrawn as export products is produced.

A preferred embodiment of purification section 60 uses a pressure swing adsorption device to withdraw a hydrocarbon stream 61 from the mixture. The reject gas mixture 62, substantially a mixture of hydrogen, remaining hydrocarbons and carbon oxides, may be collected from the less adsorbed species exit gas stream, whereas the hydrocarbon export stream may be collected from the more adsorbed species gas stream. In the case where the reject gas mixture 62 is reused, the pressure swing adsorption device delivers the mixture 62 at: a) at system pressure (less pressure drop due to flow resistance); and b) stripped (by adsorption) of contaminants, such as hydrogen sulphide or other sulphur compounds, which may poison catalysts in an optional steam reformer. The ratio of hydrocarbons withdrawn as product in stream 61 to the total hydrocarbons in the converted gas mixture 48 can range from 1% to 100% by volume. In the case of an optional steam reformer, the preferred ratio is in the range of 20% to 70%.

Another preferred separation device is a pressurized membrane, where the hydrogen gas is separated from the hydrocarbon gases in one or more stages with the retentate being delivered at a higher pressure than the permeate.

Converted gas mixture 48 may contain hydrogen that was not reacted in any conversion reaction. This excess hydrogen is a valuable reactant and is preferably recycled from the converted gas mixture back to the upstream hydrogen requirements. The hydrogen may be sourced from any convenient location within product purifier 50, for example stream 48, stream 53, stream 57 or purifier 60. The hydrogen stream collected from product purifier 50 may pass through a distinct separation device (not shown) to purify the content of the stream. The hydrogen may be returned directly to the pyrolysis or conversion reactors, or mixed with reformer reactants and passed through the steam reformer 70, or bypass the reformer 70 and be remixed with the reformer product hydrogen stream 73 or optionally enriched stream 77.

When an external source of hydrogen is not available to fully supply hydrogen requirements (after any hydrogen recycle), a portion of the hydrocarbons and/or water of the converted gas mixture 48 may be used to generate the hydrogen required for pyrolysis and conversion reactors in a hydrogen generator. One preferred embodiment is the steam reformer 70. A steam reformer is a well understood process commercially available by numerous suppliers, comprising at least a reactor vessel 71 and a heat exchange device 72 supplying energy to the endothermic reforming process. Water reactant may be sourced from any convenient point in product purifier 50 such as the optional condenser recirculating stream 59 (in liquid state) or as steam from any stage of cooling section 51. Hydrocarbon reactant may be sourced from purification section 60 as a portion of the export product or as a portion of any reject gas mixture. Hydrocarbons may also be collected along with steam collection from cooling section 51. Additional hydrocarbons may be added from any other source. The hydrogen required for reaction (3) can be produced, with full conversion of $CH_4$ and full shift of CO to $CO_2$, according to the overall reaction (4):

$$CH_4 + 2H_2O \rightarrow 4H_2 + CO_2 \tag{4}$$

The reformer product stream 73 comprises a mixture of carbon oxides, hydrogen, unreacted hydrocarbon and excess water. After processing by an optional water gas shift reactor (not shown), the reformer product stream is sent to the pyrolysis and conversion reactors through optional hydrogen separator 74. Hydrogen separator 74 can use adsorption, membrane, absorption, cryogenic or other methods as is well known to those of ordinary skill in the art to remove a portion of the carbon oxides and/or water from reformer product stream 73. A preferred method is to use a pressure swing adsorption device to generate a hydrogen rich stream 77 and a carbon oxide rich reject stream 76. Another preferred method of hydrogen generation is to use a reformer and separator including sorption enhanced water gas shift.

The reformer reactor 71 requires a heat source to energize the endothermic reaction (4) as represented by heat exchanger 72. In certain cases, a heat source from another process may be utilized, generally by co-locating with another industrial process. Concentrated solar power is also contemplated. However, this option is not always available, and the disclosed process plant can generate enough heat from combustion of some of the non-exported products exiting the separation devices found herein to augment imported heat or to fully supply all the required heat. Heat for reformer vessel 71 is typically generated by oxidation in burner 75 of carbonaceous fuels. Energy required increases with increasing stoichiometric ratio S. The carbon oxide rich stream 76 from hydrogen separator 74 can be used as a gaseous fuel. Additional fuel stream 78 can include char from char separation device 34 and gas solid separation device 35, recovered carbonaceous materials from oil separator 54 or oil water separator 58, raw or dried biomass from feedstock 10 or other sources, recovered hydrocarbons from any of the separation devices, or other fuel as available. Waste products from other processes may be utilized, including but not limited to crop and municipal waste, other biomass process wastes such as algae residue, lignin from cellulosic ethanol production or distiller mash. Solid combustion fuels may be optionally gasified prior to oxidation.

Fuel from a natural gas pipeline may be used initially to generate heat to bring the overall process to operating conditions, subsequently exporting the hydrocarbon product to same pipeline while using fuels derived from some or all of the aforementioned separation devices.

Optional burner 75, normally operating at atmospheric pressure, uses an oxygen-containing gas oxidant and may generate carbon dioxide as a combustion product. The flue gas may also be treated to extract a portion of the carbon dioxide for sequestration purposes. In some cases, additional emission control equipment, as is well known in the art, may be used to clean the flue gas before emitting to the atmosphere. Certain burner designs may optionally be used to minimize the formation of some chemical emissions such as nitrogen oxides. Certain entrained chemicals in fuel stream 78 may not combust in burner 75, producing a remaining ash product. The ash may be used as a fertilizer, especially on the land harvested for the biomass feedstock 10, or other useful product, or may be disposed.

The recycle hydrogen stream 77 may contain carbon oxides and unreacted hydrocarbons. Hydrogen purity is preferably within the range of about 85% to 99.9% by volume. Lower purity generally allows a higher recovery of hydrogen in hydrogen separator 74. In one preferred embodiment, enriched stream 77 is the source of sweep gas stream 37 and hydrogen mixture gas 44.

Another optional hydrogen generator uses the process of steam gasification of at least a portion of the char produced in the pyrolyzer. Optionally additional biomass may be added to the char. An oxygen fired direct gasifier may produce a syngas which may optionally be subjected to a water gas shift process for added hydrogen production. The resultant gasification gases require separation for removal of at least a portion of the carbon oxides before injection into the hydrogen mixed gas stream 44. Alternatively, an air fired indirect gasifier may be used in place of the direct gasifier.

An inventive preferred feature is that substantially all the hydrogen and water exiting the conversion process is recycled back to the pyrolysis and/or conversion processes as hydrogen gas. The water is consumed in the reformer process with rejected hydrocarbons as per reaction (4) to generate hydrogen. In this way hydrogen molecules can only leave the conversion process as part of a hydrocarbon compound other than minor losses in the different separation devices. Product purifier 50 may be used as an active control element to control the overall biomass conversion process by controlling and altering the purifier process characteristics determining the withdrawal rates of the hydrocarbon product. In the case where stoichiometric ratio S is larger than targeted, purifier 50 withdraws more hydrocarbon product which reduces the generated hydrogen and reducing ratio S. In the case where ratio S is less than targeted, purifier 50 withdraws less hydrocarbon product which increases the generated hydrogen and increases ratio S. Changes in the ratio S may be created by variable biomass flows and compositions, changing catalytic reactivity, changing separation device characteristics, changing biomass feed device characteristics, or any other system perturbations and drifting characteristics. This control strategy may be utilized with any hydrocarbon conversion or hydrogenation system utilizing a recycle of hydrogen molecules.

The overall process can be represented by addition of reaction (3) and 2.875 times (4) to yield reaction (5):

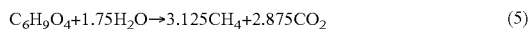

$$C_6H_9O_4 + 1.75H_2O \rightarrow 3.125CH_4 + 2.875CO_2 \quad (5)$$

The additional water required to manufacture the hydrogen needed for conversion reaction (3) can be obtained from an external source or from the water released by drying the biomass or a combination. One preferred option is to use no external source for process water. Standard boiler feed water treatment to reduce inorganic chemicals prior to introduction of the water to the process is a preferred option.

The system is preferably operated at pressure. However, a system with a process recycle requires a device such as a compressor, ejector or blower to boost the pressure of the recycle fluid for re-entry to the main process. The pressure boosting device is preferably placed in a relatively cooler stream to reduce efficiency losses and capital costs. A preferred stream for recompression is reject mixture stream 62. Compression losses are minimized if the heat of compression is utilized as a portion of the energy required for heating.

The biomass may also be mixed with a fossil fuel such as petroleum or natural gas or any of their derivatives, with a product of fossil fuels such as plastic, resin or organic chemical or with animal derived biomass.

EXAMPLES

The following examples are provided to illustrate certain features of working embodiments. A person of ordinary skill in the art will appreciate that the invention is not limited to these features.

Experimental Results:

A bio oil feed made from pyrolysis of oat hulls was revaporized by pumping the bio oil over heated glass material to create a pygas. Bio oil composition is known to be very similar in chemical composition to pygas. In this series of tests, a parallel feed of hydrogen gas, with a stoichiometric value S, as related to the bio oil feed on a water free basis, of 2.3 was injected into the revaporization vessel. The pygas and hydrogen were then sent to a catalytic reactor containing an activated commercial methanation catalyst advertised as comprising nickel on alumina. The resulting converted gas mixture was subsequently cooled in a knock out pot and the gas content and condensed materials analyzed and measured.

In one test, with a revaporization bed temperature of 550° C., at an operating pressure of 11 bara, the pygas mixture was sent into a catalytic reactor at 550° C. for a residence time of 2.6 seconds. The product gas carbon selectivity to methane was measured at over 99%, and the (total) condensable tar collected in a knock out pot yielded less than 0.3% by weight of the bio oil (dry basis). By comparison, Scott disclosed, in U.S. Pat. No. 4,822,935, an atmospheric run using a nickel-on-alumina catalyst at 560° C. and an estimated stoichiometric ratio S of 2.9 and a residence time of between 0.43 to 0.45 seconds, yielding product gas methane selectivity of 90% and 1.33% (total) condensable tar.

In another test, with a bio oil revaporization temperature of 450° C. operated at atmospheric and at 6 bara pressure, carbon dioxide was detected (0.2% by volume of carbon containing gases) in the converted reactor gas in the atmospheric run (residence time of 0.3 seconds) with a methane selectivity of 98%. The 6 bara run (residence time of 1.5 seconds) exhibited a methane selectivity of 99% with no detection of any carbon oxide.

In another test, the bio oil revaporization created a char residue on the glass material upstream of the catalyst. At the 450° C. temperature, the weight ratio of char created to bio oil delivered (dry basis), as measured at the end of the run, was calculated. At the atmospheric pressure condition, the weight ratio was 18% of input carbon. At a pressure condition of 21 bara, the weight ratio was 8% of input carbon.

Industrial Usage:

The inventive process and apparatus are useful for high efficiency conversion of biomass into a natural gas commodity. The product can be used directly or can be injected into a gas pipeline or liquefaction facility for contribution as a widely distributed good. The renewable, sustainable, and carbon neutral nature of the biomass feedstock may enhance the value of the exported product, especially when natural gas is used to generate electricity, to generate heat, or as a transportation fuel. Preferred options are to earmark the exported pipeline product as fuel for a natural gas combined cycle power generator to yield a high efficiency biomass to electricity system, as supply for a compressed or liquefied natural gas station for transportation fuel, as a fuel for natural gas boilers and burners to produce renewable energy, or as a feedstock for chemical processing for renewable product manufacturing. Earmarking is defined here as an allocation or assignment of non-physical attributes of a material supplied into a fungible pool to a specific user where the user withdraws equivalent material from said pool. In certain cases the product can be exported across borders creating a renewable energy industry from biomass. The product may also be used as feedstock for transport and export as liquefied natural gas by ship.

An example of direct use of the conversion plant product is supply of one of or a combination of a natural gas internal combustion engine or turbine to generate power, a supply of a natural gas boiler or burner to generate heat energy, a supply to a compressed natural gas station for transportation fuel.

Another example of direct use of the conversion plant is to feed the hydrocarbon product to a high temperature fuel cell, such as a solid oxide fuel cell, for production of electricity. The fuel cell system generally emits heat, which can be collected and used as a heat source for the steam reformer instead of combustion of pyrolysis char.

Certain combinations of catalysts and conversion sections 42 can yield both liquid and gaseous hydrocarbon products which can be separated in product purifier 50 and exported as different products. Optional export of unused char is also contemplated.

Biomass harvesting, collection, and transporting costs for central gathering increase with the mean distance of travel to the collection area. In the case of an operation using the inventive process and apparatus, a larger mass flow requirement in general creates a higher cost of biomass feedstock per unit mass. However, process plant capital and operating costs generally decrease per unit mass throughput with increasing mass flow. A minimum cost of export products, and hence a more successful operation, occurs with a minimized feedstock cost coupled with a matched maximized operation capacity. A preferred operation capacity range for minimizing total costs of export products is between about 300 dry tonnes per day and about 1500 dry tonnes of biomass per day, and more preferably between 500 and 1000 dry tonnes of biomass per day.

Enhanced production of hydrocarbons is often possible by supplying hydrogen or heat to the process as a by-product of a different process. For example, a chlor-alkali plant, often co-located with a pulp production plant, produces hydrogen as a by product. This hydrogen can be used to reduce or eliminate the steam reformer 70, reducing or eliminating hydrocarbon recycle. In certain cases, the pulp mill residue can be utilized as a biomass feedstock.

In another example, a methane fed Fischer Tropsch, methanol or other chemical synthesis plant may use the export product hydrocarbon as a feedstock and supply high quality heat to the steam reformer 70. Secondary products such as pyrolysis char, no longer required to generate heat, may be exported for other purposes such as carbon sequestration or beneficial soil additive.

In another example, the inventive process and apparatus can be augmented with wind or solar powered electrolysis equipment. Power from wind or solar sources can be converted to hydrogen and oxygen generation as is well known in the art. The hydrogen can be supplied to the pyrolysis or catalytic reactors, increasing the export rates of produced hydrocarbons by reducing recycle requirements. Water recovered from the converted gas mixture may be utilized as the feedstock for the electrolysis process. The exported hydrocarbons may then be transported by pipeline as an energy carrier. The produced oxygen may be used as reformer oxidant producing a more concentrated carbon dioxide in the flue gas stream for easier capture.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for producing hydrocarbon from biomass, comprising:
    performing fast pyrolysis on biomass to produce pygas and char using a maximum processing temperature of about 650° C.; and
    providing the pygas and hydrogen to an independent reactor without the addition of an oxidizing agent for catalytically converting the pygas to hydrocarbons using a maximum processing temperature of about 650° C., where both performing fast pyrolysis and catalytically converting the pygas to hydrocarbon minimizes tar production to less than about 1% of biomass processed relative to amount of tar produced from that biomass.

2. The method according to claim 1 where at least a portion of the hydrogen is added from an external source.

3. The method according to claim 1 where at least a portion of the hydrogen is produced by steam reformation of at least a portion of the hydrocarbons.

4. The method according to claim 3 where the steam produced while catalytically converting the pygas to hydrocarbons is used for the steam reformation.

5. The method according to claim 1 where performing fast pyrolysis comprises producing a char product and where char contact time with the pygas is less than about 5 seconds.

6. The method according to claim 1 where performing fast pyrolysis comprises using a sweep gas comprising hydrogen.

7. The method according to claim 1 where catalytically converting the pygas to hydrocarbons comprises using a stoichiometric ratio of hydrogen over biomass of over 0.5.

8. The method according to claim 1 where catalytically converting the pygas to hydrocarbons comprises using a total atomic hydrogen-to-carbon ratio of gas in the reactor of over 4.

9. The method according to claim 1 where catalytically converting the pygas to hydrocarbons comprises using a catalyst, and the catalyst contact time with the pygas is less than 60 minutes.

10. The method according to claim 1 where performing fast pyrolysis and catalytically converting the pygas to hydrocarbons comprises using a hydrogen partial pressure of from about 0.5 bar to about 100 bar.

11. The method according to claim 1 comprising using a system comprising a biomass pyrolyzer, an independent catalytic converter downstream of the pyrolyzer, and a product purifier downstream of the catalytic converter.

12. The method according to claim 11 where the system further comprises a mineral oil heat exchanger and/or a condenser cooler and/or a pressure swing adsorber downstream of the catalytic converter.

13. The method according to claim 1 where performing fast pyrolysis and catalytically converting the pygas to hydrocarbons comprises using a process pressure between 2 bara to 100 bara.

14. The method according to claim 1 where catalytically converting the pygas to hydrocarbons comprises using an independent reactor and optionally one or more of a guard bed, a single catalyst, multiple catalysts, catalysts incorporating selective hydrocarbon forming catalyst and a support active for cracking oxygenated hydrocarbons, an operation temperature less than about 650° C., a depolymerization section, a hydrodeoxidation section, a moving bed, fixed beds with valving, a catalyst decoker, and any and all combinations thereof.

15. The method according to claim 14 where catalytically converting the pygas to hydrocarbons comprises using a methane-forming catalyst.

16. The method according to claim 15 where the catalyst is nickel on alumina.

17. The method according to claim 14 where the catalyst is a light hydrocarbon forming catalyst.

18. The method according to claim 1 where performing fast pyrolysis and catalytically converting the pygas to hydrocarbons comprises using one or more of an operating pressure of less than 100 bara, an operating temperature of between 400° C. and 650° C., a sweep gas, a moving bed, an auger transport mechanism, a char contact time less than 5 seconds, a stoichiometric ratio of hydrogen over biomass of over 0.5, a hydrogen partial pressure of from about 0.5 bar to about 100 bar, heating media, catalyst cooling, multiple heating vessels operating in staggered phase, gas-solid separators operating above 350° C., and any and all combinations thereof.

19. The method according to claim 1 where performing fast pyrolysis comprises using heating media.

20. The method according to claim 19 where the heating media has a heat capacity greater than 0.3 cal/cm$^3$/K, a weight ratio of heating media to biomass of at least 5:1, a temperature drop following contacting biomass of less than 100° C., and any and all combinations thereof.

21. The method according to claim 19 where the heating media comprises steel or magnetite.

22. The method according to claim 1 where the method comprises fast pyrolysis, independent catalytic conversion and hydrogen recycle.

23. The method according to claim 1 further comprising using char from the pyrolysis process to heat a hydrogen generating reformer.

24. The method according to claim 1 where the method comprises using a product purifier export-to-feed hydrocarbon ratio for controlling hydrogen stoichiometric ratio in the conversion reactor.

25. A method for producing hydrocarbon from biomass that minimizes tar production to less than about 1% of biomass processed relative to amount of tar produced by that biomass, the method comprising:
performing fast pyrolysis on biomass to produce pygas and char using a maximum processing temperature of about 650° C. and a sweep gas comprising hydrogen;
providing the pygas to an independent reactor without addition of an oxidant for catalytically converting the pygas to hydrocarbons using a maximum processing temperature of about 650° C.;
whereby catalytically converting the pygas to hydrocarbons comprises using a stoichiometric ratio of hydrogen over biomass of over 0.5, and a hydrogen partial pressure of from about 0.5 bar to about 100 bar.

26. The method according to claim 25 further comprising adding hydrogen to the independent reactor.

27. The method according to claim 26 where at least a portion of the hydrogen is added from a source external to the system.

28. The method according to claim 26 where at least a portion of the hydrogen is produced by steam reformation of at least a portion of the hydrocarbons where the steam is produced during production of the pygas.

29. A system for producing hydrocarbons from biomass that minimizes tar production to less than about 1% based on mass of biomass processed and amount of tar produced, the system comprising:
fast pyrolysis means operating at a process temperature of less than 650° C. for producing a pygas and char;
independent catalytic conversion means downstream of the fast pyrolysis means operating at a process temperature of less than 650° C. for converting the pygas to hydrocarbons; and
a hydrogen source for adding hydrogen to the independent catalytic conversion means.

30. The system according to claim 29 where the hydrogen is produced by a steam reformer by steam reformation of at least a portion of the hydrocarbons.

31. The system according to claim 29 where the fast pyrolysis means includes a hydrogen sweep gas.

32. The system according to claim 29 where the fast pyrolysis means and catalytic conversion means operate at one or more of a stoichiometric ratio of hydrogen over biomass of over 0.5, a total atomic hydrogen-to-carbon ratio of gas in the reactor of over 4, and a hydrogen partial pressure between 0.5 bar to 100 bar in both the fast pyrolysis means and the catalytic conversion means.

33. The system according to claim 29 further comprising tar minimization means downstream of the catalytic conversion means.

34. The system according to claim 33 where the tar minimization means comprises a mineral oil heat exchanger operating with a high boiling fraction of a paraffinic hydrocarbon mixture and an oil separator.

35. The system according to claim 29 operating at a pressure between 2 bara to 100 bara.

36. The system according to claim 29 where the independent catalytic conversion means optionally includes one or more of a guard bed, a single catalyst, multiple catalysts, catalysts incorporating selective hydrocarbon forming catalyst and a support active for cracking oxygenated hydrocarbons, a depolymerization section, a hydrodeoxidation section, a moving bed, fixed beds with valving, catalyst decoker, and any and all combinations thereof.

37. The system according to claim 36 where the catalyst is a methane-forming catalyst.

38. The system according to claim 36 where the catalyst is a light hydrocarbon forming catalyst.

39. The system according to claim 26 where fast pyrolysis means operates at or includes one or more of an operating pressure of less than 100 bara, an operating temperature of between 400° C. and 650° C., a sweep gas, a moving bed, an auger transport mechanism, a char contact time less than 5 seconds, a hydrogen partial pressure between 0.5 bar to 100 bar, heating media, a heated media contact temperature of less than 650° C., and any and all combinations thereof.

40. The system according to claim 29 where the fast pyrolysis means includes heating media, heating media having a heat capacity greater than 0.3 cal/cm$^3$/K, a weight ratio of heating media to biomass is at least 5:1, and any and all combinations thereof.

41. The system according to claim 40 where the heating media is steel or magnetite.

42. The system according to claim 40 where the heating media is magnetic magnetite particles and the magnetic properties are used in a char separator.

43. The system according to claim 40 where the heating media is magnetic magnetite particles and a steam iron process is utilized to generate hydrogen in a pyrolysis section.

44. The system according to claim 29 where at least a portion of the hydrocarbons is exported as a renewable, sustainable and/or carbon neutral fuel and/or feedstock.

45. The system according to claim 44 where exported hydrocarbons are used for producing renewable, sustainable and/or carbon neutral electric power.

46. A system for producing hydrocarbons from biomass that minimizes tar production to less than about 1% based on mass of biomass processed and amount of tar produced, the system comprising:
  a biomass fast pyrolyzer operating at a process temperature of less than 650° C. and using a sweep gas comprising hydrogen for producing a pygas and char, the pyrolyzer including heating media;
  an independent catalytic converter downstream of the fast pyrolyzer operating at a process temperature of less than 650° C. and without addition of an oxidant for converting the pygas to hydrocarbons;
  a hydrogen source;
  whereby catalytically converting the pygas to hydrocarbons comprises using a stoichiometric ratio of hydrogen over biomass of over 0.5, and a hydrogen partial pressure of from about 0.5 bar to about 100 bar.

47. A system operating at a pressure between 2 bara to 100 bara for producing hydrocarbons from biomass that minimizes tar production to less than about 1% based on mass of biomass processed and amount of tar produced, the system comprising:
  a biomass fast pyrolyzer operating at a process temperature of less than 650° C. and using a sweep gas comprising hydrogen for producing a pygas and char;
  an independent catalytic converter downstream of the fast pyrolyzer operating at a process temperature of less than 650° C. for converting the pygas to hydrocarbons;
  a steam reformer fluidly coupled to the catalytic converter for producing hydrogen from at least a portion of the hydrocarbons; and
  whereby performing fast pyrolysis and catalytically converting the pygas to hydrocarbon comprise using a stoichiometric ratio of hydrogen over biomass of over 0.5, and a hydrogen partial pressure of from about 0.5 bar to about 100 bar.

48. A system operating at a pressure between 2 bara to 100 bara for producing hydrocarbons from biomass that minimizes tar production to less than about 1% based on mass of biomass processed and amount of tar produced, the system comprising:
  a biomass fast pyrolyzer operating at a process temperature of less than 650° C. and using a hydrogen containing sweep gas for producing a pygas and char;
  an independent catalytic converter downstream of the fast pyrolyzer for converting the pygas to hydrocarbons;
  a product purifier downstream of the catalytic converter for withdrawing a portion of the hydrocarbons for export;
  a steam reformer fluidly coupled to the product purifier for producing hydrogen from at least a portion of the hydrocarbons; and
  whereby performing catalytically converting the pygas to hydrocarbon comprise using a stoichiometric ratio of hydrogen over biomass of over 0.5, and a hydrogen partial pressure of from about 0.5 bar to about 100 bar.

49. The system according to claim 48 whereby performing product purification comprises recycling excess hydrogen back to the fast pyrolyzer and catalytic converter.

50. A process for hydrogenating a material in a conversion reactor, comprising:
  hydrogenating a first portion of the material in a conversion reactor to produce a hydrogenated product;
  separating a portion of the hydrogenated product in a separator downstream of the conversion reactor to provide a separated hydrogenated product portion; and
  recycling residual hydrogen and remaining hydrogenated material back to the conversion reactor, where the separated hydrogenated product portion is selected to control a hydrogen-to-material ratio in the conversion reactor.

* * * * *